US011946196B2

(12) United States Patent
Zhou et al.

(10) Patent No.: US 11,946,196 B2
(45) Date of Patent: Apr. 2, 2024

(54) ATMOSPHERIC-PRESSURE PLASMA DEVICE FOR FABRIC FUNCTIONAL FINISHING AND ITS APPLICATION

(71) Applicant: Jiangnan University, Wuxi (CN)

(72) Inventors: Chang-E Zhou, Wuxi (CN); Hongwei Wang, Suzhou (CN); Wenkai Shen, Wuxi (CN); Lei Fan, Wuxi (CN); Xin Ju, Wuxi (CN); Guozheng Zhang, Wuxi (CN); Tongxin Yang, Wuxi (CN); Wanning Wang, Wuxi (CN); Chang Sun, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 519 days.

(21) Appl. No.: 17/215,261

(22) Filed: Mar. 29, 2021

(65) Prior Publication Data

US 2021/0214885 A1 Jul. 15, 2021

Related U.S. Application Data

(63) Continuation of application No. PCT/CN2019/129709, filed on Dec. 30, 2019.

(30) Foreign Application Priority Data

May 20, 2019 (CN) ......................... 201910418739.7

(51) Int. Cl.
*D06M 10/08* (2006.01)
*D06M 11/07* (2006.01)
(Continued)

(52) U.S. Cl.
CPC ............ *D06M 10/08* (2013.01); *D06M 11/07* (2013.01); *D06M 16/00* (2013.01); *H05H 1/24* (2013.01);
(Continued)

(58) Field of Classification Search
None
See application file for complete search history.

(56) References Cited

U.S. PATENT DOCUMENTS 6,099,457 A * 8/2000 Good ........................ G21G 4/06 600/8
6,666,811 B1 * 12/2003 Good .................. C23C 14/3407 427/5
(Continued)

FOREIGN PATENT DOCUMENTS

CN 105734951 A 7/2016
CN 105829091 A 8/2016
(Continued)

OTHER PUBLICATIONS

Chen,Yin et al "Application of plasma in surface modification of medical materials" Nonwovens, V 14, No. 6, Dec. 31, 2006, ISSN 1005-205, p. 30.

*Primary Examiner* — Srinivas Sathiraju
(74) *Attorney, Agent, or Firm* — IPRO, PLLC; Na Xu

(57) ABSTRACT

The present disclosure discloses an atmospheric-pressure plasma equipment for fabric functional finishing and its application, and belongs to the field of textile printing and dyeing engineering. The atmospheric-pressure plasma equipment, including a discharging system, a grafting instrument and a cloth guider, can conduct continuous plasma treatment on fabrics under an atmospheric pressure, including plasma etching and plasma grafting, which breaks through the disadvantage of batch processing of vacuum plasma equipment. The equipment and method of the present disclosure realize functional finishing of the fabrics in the absence of water, and this finishing process is cost efficient, environmentally friendly, uniform, shorter treat-
(Continued)

ment time and higher reactivity, and applicable to many materials and can keep the bulk properties of the treated substances.

19 Claims, 4 Drawing Sheets

(51) Int. Cl.
*D06M 16/00* (2006.01)
*D06M 101/06* (2006.01)
*H05H 1/24* (2006.01)

(52) U.S. Cl.
CPC .... *D06M 2101/06* (2013.01); *D06M 2200/11* (2013.01); *D06M 2200/12* (2013.01); *D06M 2200/30* (2013.01)

(56) References Cited

U.S. PATENT DOCUMENTS

| | | | | | |
|---|---|---|---|---|---|
| 7,678,429 | B2 * | 3/2010 | Goodwin | H05H 1/46 | 427/561 |
| 7,758,928 | B2 * | 7/2010 | Bunce | B01J 8/1818 | 427/451 |
| 8,281,734 | B2 * | 10/2012 | Kennedy | F16J 15/168 | 427/457 |
| 9,205,595 | B2 * | 12/2015 | Simor | C08J 7/18 | |
| 9,309,619 | B2 * | 4/2016 | Mistry | D06M 10/005 | |
| 10,533,114 | B2 * | 1/2020 | Riccardi | B05D 3/147 | |
| 10,827,601 | B1 * | 11/2020 | Williams | H05H 1/46 | |
| 10,906,008 | B2 * | 2/2021 | Sawada | B01D 69/1213 | |
| 2004/0242953 | A1 * | 12/2004 | Good | C23C 14/0057 | 600/7 |
| 2005/0158480 | A1 * | 7/2005 | Goodwin | C23C 4/123 | 427/569 |
| 2008/0056928 | A1 * | 3/2008 | Bunce | C09C 1/3615 | 422/186.04 |
| 2013/0001204 | A1 * | 1/2013 | Mistry | D06M 10/005 | 219/121.36 |
| 2014/0377476 | A1 * | 12/2014 | Mistry | D06M 10/005 | 219/121.36 |
| 2015/0239007 | A1 * | 8/2015 | Selwyn | B05D 3/147 | 427/501 |
| 2015/0275363 | A1 * | 10/2015 | Sershen | C23C 16/4584 | 118/730 |
| 2016/0121636 | A1 * | 5/2016 | Shibusawa | C23C 14/34 | 101/127 |
| 2016/0122585 | A1 * | 5/2016 | Riccardi | C08L 83/06 | 523/400 |
| 2016/0250831 | A1 * | 9/2016 | Gladish | D06M 15/15 | 428/137 |
| 2018/0272291 | A1 * | 9/2018 | Sawada | B32B 27/322 | |
| 2018/0272292 | A1 * | 9/2018 | Mochizuki | C08J 7/046 | |
| 2020/0223201 | A1 * | 7/2020 | Gladish | D06M 15/15 | |
| 2021/0214885 | A1 * | 7/2021 | Zhou | D06M 14/18 | |
| 2022/0087900 | A1 * | 3/2022 | Taha | C23C 16/45561 | |
| 2023/0271218 | A1 * | 8/2023 | Hussey | C23C 4/134 | 427/488 |

FOREIGN PATENT DOCUMENTS

| | | | | |
|---|---|---|---|---|
| CN | 107044053 A | 8/2017 | | |
| CN | 110042649 A | 7/2019 | | |
| WO | WO-2015061079 A1 * | 4/2015 | | B32B 27/36 |
| WO | 2017200930 A1 | 11/2017 | | |

* cited by examiner

ATMOSPHERIC-PRESSURE PLASMA DEVICE FOR FABRIC FUNCTIONAL FINISHING AND ITS APPLICATION

TECHNICAL FIELD

The present disclosure relates to an atmospheric-pressure plasma equipment for fabric functional finishing and its application, and belongs to the field of textile printing and dyeing engineering.

BACKGROUND

Textile industry is a traditional pillar industry in China, including weaving, dyeing and finishing, clothing, special textile equipment manufacturing, etc. With the rapid development of the national economy, Chinese printing and dyeing industry has entered a period of rapid development; the equipment and technical level has been significantly improved; a production process and equipment have been constantly updated; and dyeing and finishing processing occupies a pivotal position in the textile industry. Cost control in the dyeing and finishing process directly affects the economic value of fabrics. Therefore, the cost should be strictly controlled in the finishing process of the fabrics.

In a traditional process, both pretreatment and finishing of the fabrics are wet treatment, resulting in a large amount of waste water containing complex chemical substances, which not only wastes resources, but also causes environmental pollution. Therefore, the dyeing and finishing processing industry is in urgent need of a less water or even water-free processing method. Although the current emergence of low bath ratio dyeing equipment, a short-process dyeing process, a digital jet printing technology, a thermal transfer printing technology, a foam finishing technology and a waste heat recovery technology has played a certain role in mitigating the pollution of the dyeing and finishing industry, these existing clean production technologies still have problems such as waste water pollution and high energy consumption. Although a supercritical carbon dioxide dyeing technology and a vacuum plasma technology can realize water-free dyeing and finishing processing, there are still technical problems in industrial production respectively due to a high-pressure condition and a vacuum condition.

SUMMARY

Aiming at the above problems, the present disclosure provides an atmospheric-pressure plasma equipment capable of continuous production of fabrics and its applications in the textile printing and dyeing industry. The atmospheric-pressure plasma equipment of the present disclosure can make the continuous processing of textiles with plasma treatment come true under an atmospheric pressure condition, which can solve the problems of high wastewater and high energy consumption in traditional printing and dyeing processing.

The present disclosure firstly provides an atmospheric-pressure plasma equipment, including a carrier gas pipeline (1), a reactive gas pipeline (2), a carrier gas pipeline (6), a grafting gas pipeline (14), a first pipeline (15), a second pipeline (16), a third pipeline (17), a single-electrode plasma generator cathode (24) and a single-electrode plasma generator anode (25). The third pipeline (17) is connected with a single-electrode plasma generator consisting of the single-electrode plasma generator cathode (24) and the single-electrode plasma generator anode (25). Gas in the third pipeline (17) is gas in the first pipeline (15) or gas in the second pipeline (16); the gas in the first pipeline (15) is formed by converging carrier gas in the carrier gas pipeline (1) and reactive gas in the reactive gas pipeline (2); and the gas in the second pipeline (16) is formed by converging carrier gas in the carrier gas pipeline (6) and grafting gas in the grafting gas pipeline (14). The other end of the grafting gas pipeline (14) is connected with a grafting tank (8); heating equipment (10) is mounted outside the grafting tank (8); and the grafting gas in the grafting gas pipeline (14) is obtained by gasifying grafting monomers in the grafting tank (8). A solenoid valve (4) and a flowmeter (5) are mounted on each of the carrier gas pipeline (1), the reactive gas pipeline (2), the carrier gas pipeline (6) and the grafting gas pipeline (14).

The single-electrode plasma generator consisting of the single-electrode plasma generator cathode (24) and the single-electrode plasma generator anode (25) is connected with a power matcher (26) through a power line. The single-electrode plasma generator is located in a housing with holes (29); the power matcher (26), a cloth guide roller (28) and a cloth guide roller (21) with an adjustable-speed motor are respectively located outside the housing with holes (29); the cloth guide roller (28) and the cloth guide roller (21) with the adjustable-speed motor are respectively arranged on two sides of the housing with holes (29) and are parallel to each other, and holes allowing a fabric and the power line to enter and exit are formed in the housing with holes (29).

A copper pipe is placed in the single-electrode plasma generator cathode (24); a small hole is formed in the copper pipe as a gas outlet (18) of gas; the gas outlet (18) is located above the single-electrode plasma generator anode (25); and the gas in the third pipeline (17) enters the single-electrode plasma generator through the gas outlet (18) in the single-electrode plasma generator cathode.

In one implementation of the present disclosure, the single-electrode plasma generator cathode (24) is formed from two aluminum alloy cuboids, and the single-electrode plasma generator anode (25) is an aluminum alloy pipe sleeved with a glass pipe; and the single-electrode plasma generator cathode (24) and the single-electrode plasma generator anode (25) are fixed through metal screws and tetrafluoroethylene insulating blocks and an aluminum alloy jacket at two ends of the electrodes to form the single-electrode plasma generator.

In one implementation of the present disclosure, the single-electrode plasma generator includes condensation equipment; the condensation equipment includes a condensate water inlet pipe (19), a condensation pipe and a condensate water outlet pipe (20) sequentially connected end to end; the condensate water inlet pipe (19) and the condensate water outlet pipe (20) are respectively located at two ends of the single-electrode plasma generator; and the condensation pipe penetrates through the single-electrode plasma generator to prevent overheating of the electrode.

In one implementation of the present disclosure, a thermal insulation layer is mounted on each of the grafting gas pipeline (14), the solenoid valve (4) and the flowmeter (5) on the grafting gas pipeline (14), the second pipeline (16) and the third pipeline (17) to prevent gas condensation of the grafting monomers.

In one implementation of the present disclosure, the power matcher (26) is connected with a power supply through the power line, and the power supply is located outside the housing with holes (29).

In one implementation of the present disclosure, the heating equipment (10) is configured to heat the grafting monomers for gasification, and the gasified grafting monomers enter the single-electrode plasma generator through the grafting gas pipeline (14), the second pipeline (16) and the third pipeline (17); and the heating equipment (10) is connected with a temperature-control heating module (12) including a heating power supply and a temperature control apparatus to provide heat and control a heating temperature.

In one implementation of the present disclosure, a feed inlet (13) is formed in the grafting tank (8) to add the grafting monomers into the grafting tank (8).

In one implementation of the present disclosure, a liquid level measuring rod (9) is mounted at the feed inlet (13) of the grafting tank (8) and configured to measure a liquid level of grafting solution (11).

In one implementation of the present disclosure, the housing with holes (29) is preferably made of organic glass.

In one implementation of the present disclosure, the fabric is parallel to the single-electrode plasma generator, and when the fabric (27) is placed on the cloth guide roller and passes under the single-electrode plasma generator, atmospheric plasma continuously treat the fabric.

In one implementation of the present disclosure, an exhaust outlet (23) and a fan (22) connected with the exhaust outlet (23) are arranged on the housing with holes (29) for collection of remaining unreacted gas.

In one implementation of the present disclosure, a discharging electrode is placed in the glass housing with holes for collecting waste gas and discharging the waste gas uniformly.

In one implementation of the present disclosure, the type of the gas or the grafting monomers adopted by the atmospheric-pressure plasma equipment corresponds to a fabric finishing effect, and different fabric finishing effects require different gas or grafting monomers.

In one implementation of the present disclosure, when the atmospheric-pressure plasma equipment is used for antibacterial finishing of fabric, the carrier gas is helium or argon, and the reactive gas is ammonia and/or nitrogen, or the grafting monomers are nitrogen-containing micromolecular organic monomers, wherein the nitrogen-containing micromolecular organic monomers are methylamine, ethylenediamine, 1,2-diaminopropane, mono-propargylamine, isopropyl amine, diisopropylamino, n-propylamine or di-n-propylamine, etc.

In one implementation of the present disclosure, when the atmospheric-pressure plasma equipment is used for water and oil repellent finishing of fabric, the carrier gas is helium or argon, and the reactive gas is carbon tetrafluoride, or the grafting monomers are difluoro ethylene, tetrafluoroethylene or hexafluoro ethylene, etc.

In one implementation of the present disclosure, when the atmospheric-pressure plasma equipment is used for flame retardant finishing of fabric, the carrier gas is helium or argon, and the reactive gas is mixed gas of carbon tetrafluoride and methylamine, or the grafting monomers are acrylic acid.

In one implementation of the present disclosure, when the atmospheric-pressure plasma equipment is used for antistatic finishing of fabric, the carrier gas is helium or argon, and the reactive gas is sulfur dioxide, or the grafting monomers are acrylic acid or vinyl monomers, etc.

In one implementation of the present disclosure, a flow speed of gas can be controlled through the flowmeters to realize stable release of the plasma.

In one implementation of the present disclosure, during grafting, the carrier gas is required to carry the gas of grafting monomers to enter discharging equipment to ensure stable discharging of plasma.

In one implementation of the present disclosure, the cloth guide roller with the adjustable-speed motor includes a speed-control switch for controlling a conveying speed of the fabric.

In addition, the present disclosure further provides a method for functional finishing of a fabric through an atmospheric-pressure plasma grafting method, and the method is carried out on the atmospheric-pressure plasma equipment.

In one implementation of the present disclosure, the method includes the following steps:

(1) firstly, turning on a main power switch of plasma equipment to power on the equipment;

(2) opening a gas cylinder of carrier gas, switching on solenoid valves and flowmeters, to test the pipelines working normally or not;

(3) when monomers used for plasma grafting for functional finishing of the fabric are gas, carrier gas in a carrier gas pipeline (1) is converged with monomers in a reactive gas pipeline (2) in a first pipeline (15), entering a third pipeline (17), and entering a single-electrode plasma generator through a gas outlet (18) in a single-electrode plasma generator cathode and change into plasma under the power; and when the monomers used for the plasma grafting for functional finishing of the fabric are liquid, the grafting monomers are added into a grafting tank (8) to be heated by heating equipment for gasification, and the gasified grafting monomers passing through a grafting gas pipeline (14) and being converged with carrier gas in a carrier gas pipeline (6) in a second pipeline (16), entering the third pipeline (17), and entering the single-electrode plasma generator through the gas outlet (18) in the single-electrode plasma generator cathode and change into plasma under the power; and (4) starting an adjustable-speed motor on a cloth guide roller (21) and adjusting a speed of cloth guide rollers to make the fabric pass under the single-electrode plasma generator so as to implement functional finishing on the fabric by the atmospheric plasma.

In one implementation of the present disclosure, functional finishing of fabric includes antibacterial finishing, water and oil repellent finishing, flame retardant finishing, antistatic finishing, etc.

In one implementation of the present disclosure, when the atmospheric-pressure plasma equipment is used for antibacterial finishing of fabric, the carrier gas is helium or argon, and the reactive gas is ammonia or nitrogen, or the grafting monomer is nitrogen-containing micromolecular organic monomer, wherein the nitrogen-containing micromolecular organic monomer is methylamine, ethylenediamine, 1,2-diaminopropane, mono-propargylamine, isopropyl amine, diisopropylamine, n-propylamine or di-n-propylamine, etc.

In one implementation of the present disclosure, when the atmospheric-pressure plasma equipment is used for water and oil repellent finishing of fabric, the carrier gas is helium or argon, and the reactive gas is carbon tetrafluoride, or the grafting monomers are fluorocarbon such as difluoro ethylene, tetrafluoroethylene and hexafluoro ethylene.

In one implementation of the present disclosure, when the atmospheric-pressure plasma equipment is used for flame retardant finishing of fabric, the carrier gas is helium or argon, and the reactive gas is carbon tetrafluoride, or the grafting monomers are acrylic acid.

In one implementation of the present disclosure, when the atmospheric-pressure plasma equipment is used for antistatic finishing, the carrier gas is helium or argon, and the reactive gas is sulfur dioxide, or the grafting monomers are acrylic acid or vinyl monomers, etc.

In one implementation of the present disclosure, flows of the carrier gas, the reactive gas and the grafting monomers shall be adjusted respectively according to a finishing effect of fabric and generating conditions of plasma of the reactive gas and monomer gas.

In one implementation of the present disclosure, the heating temperature of the grafting tank should make the grafting monomers gasify.

In one implementation of the present disclosure, when the atmospheric-pressure plasma equipment is used for antibacterial finishing of fabric, plasmatized monomers are rearranged and polymerized on the surface of the fabric (27); nitrogen-containing groups are introduced on the surface of the fabric; and after the fabric is chloridized by a sodium hypochlorite solution, an antibiotic effect is endowed to the fabric.

In one implementation of the present disclosure, operation parameters of generation of plasma are: the flow of the carrier gas is 1-15 L/min, the gasification temperature of the monomers is 0-200° C., the thermal insulation temperature for gasified monomers is 0-200° C., the flow of gasified monomers is 0.006-0.06 L/min, and the power supply power is 0-500 W.

In one implementation of the present disclosure, a conveying speed of the fabric is controlled through a motor on the cloth guide roller, and the speed range is 0.001-0.1 m/s.

Compared with the prior art, the present disclosure has the following beneficial effects:

(1) According to the present disclosure, the grafting/reactive gas is carried by the carrier gas to enter a plasma reactor anode ensuring stable discharging and the grafting/reactive monomers changing into plasma, so that the plasma grafting and plasma polymerization can be realized. And in the fabric finishing process, the fabric does not need to be activated by plasma first, and plasma polymerization can be directly occurred on the surface of the fabric to perform functional finishing. Meanwhile, the finishing process is applicable to many textile materials, and there is also no need for activated reactive radicals on the fabric.

(2) Application of the atmospheric-pressure plasma equipment of the present disclosure in the functional finishing of the fabric realize a water-free or less water finishing method for the fabric. No waste water is produced in the finishing process, so it is an environmental friendliness finishing method; and it reduces the burden of waste water treatment.

(3) The equipment overcomes the limitation of an intermittent finishing process of vacuum plasma, and makes continuous production of fabrics by plasma realized.

(4) The effect of the functional finishing of the present disclosure is comparable to that of chemical treatment, but is more environmentally friendly.

(5) The equipment and method of the present disclosure can perform functional finishing of the fabric in the absence of water, and this finishing process is rapid in reaction, short in consumed time, efficient, environmentally friendly, easy to operate and uniform in finishing effect, applicable to many textile materials and does not change the nature of the fabric.

DETAILED DESCRIPTION

Embodiment 1

Figure 1:
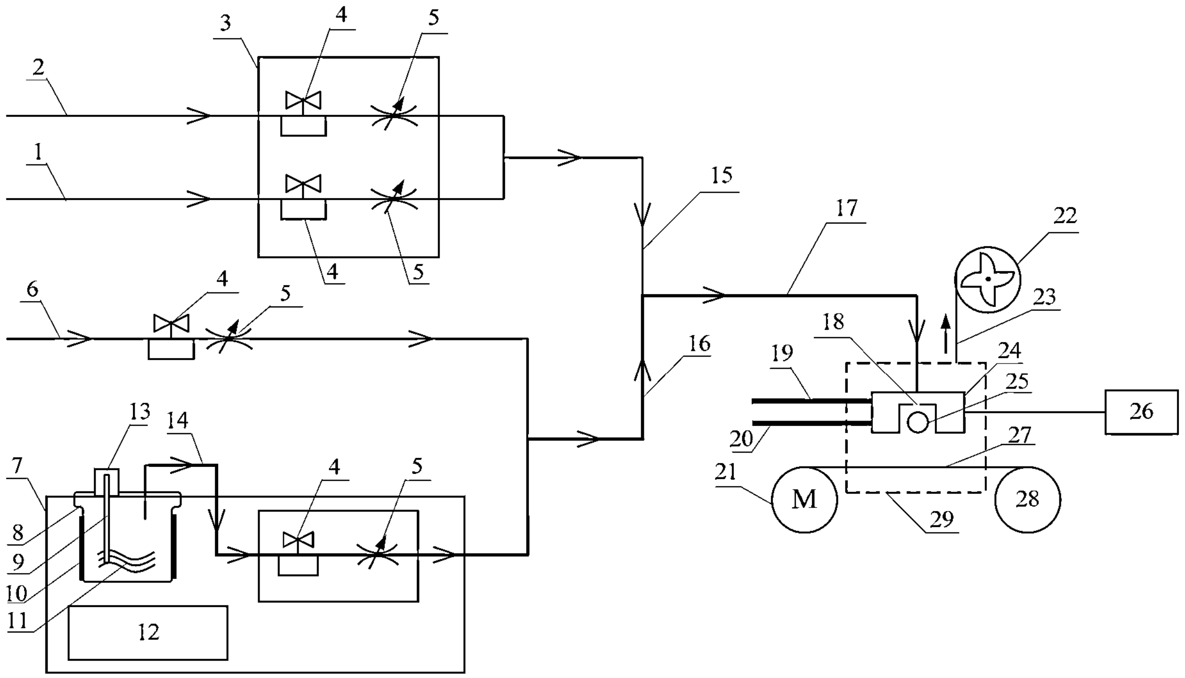
FIG. 1 is a structural schematic diagram of an atmospheric-pressure plasma equipment of the embodiment; wherein 1. Carrier gas pipeline, 2. Reactive gas pipeline, 3. Control cabinet, 4. Solenoid valve, 5. Flowmeter, 6. Carrier gas pipeline, 7. Grafting instrument, 8. Grafting tank, 9. Liquid level measuring rod, 10. Heating equipment, 11. Grafting solution, 12. Temperature-control heating module, 13. Feed inlet, 14. Grafting gas pipeline, 15. First pipeline, 16. Second pipeline, 17. Third pipeline, 18. Gas outlet, 19. Condensate water inlet pipe, 20. Condensate water outlet pipe, 21. Cloth guide roller with adjustable-speed motor, 22. Fan, 23. Exhaust outlet, 24. Single-electrode plasma generator cathode, 25. Single-electrode plasma generator anode, 26. Power matcher, 27. Fabric, 28. Cloth guide roller, and 29. Housing with holes.
Figure 2:
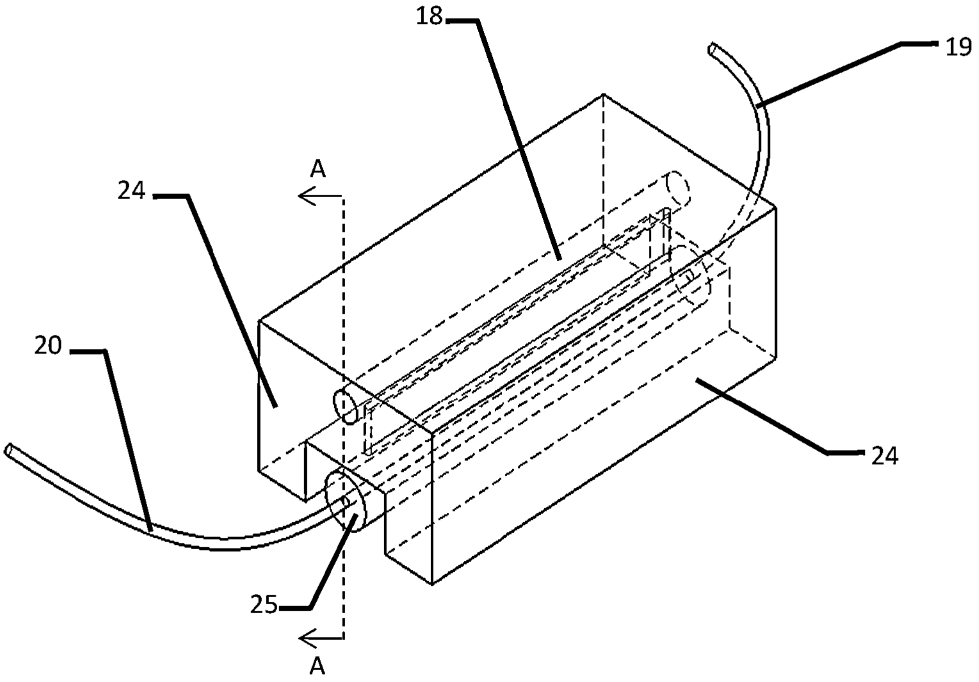
FIG. 2 is a structural schematic diagram of a single-electrode plasma generator.
Figure 3:
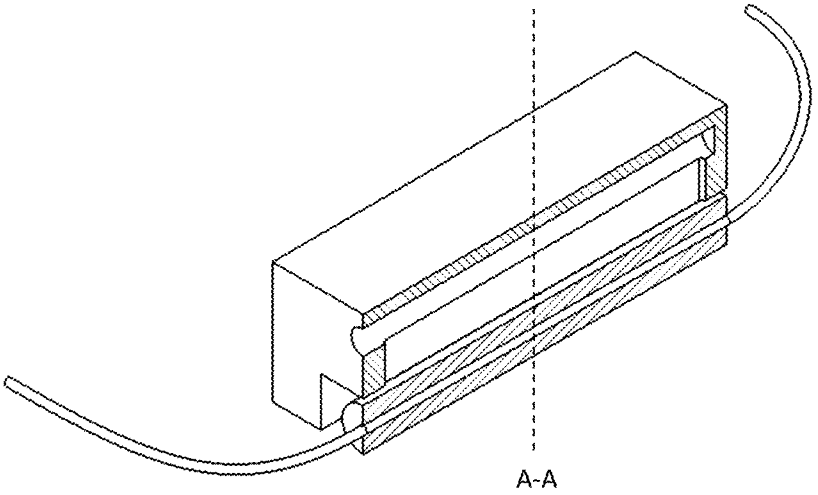
FIG. 3 is a sectional view in the direction A-A in FIG. 2.

As shown in FIGS. 1 and 2, the atmospheric-pressure plasma equipment includes a carrier gas pipeline 1, a reactive gas pipeline 2, a carrier gas pipeline 6, a grafting gas pipeline 14, a first pipeline 15, a second pipeline 16, a third pipeline 17, a single-electrode plasma generator cathod 24 and a single-electrode plasma generator anode 25. The third pipeline 17 is connected with a single-electrode plasma generator consisting of the single-electrode plasma generator cathode 24 and the single-electrode plasma generator anode 25; gas in the third pipeline 17 is gas in the first pipeline 15 or gas in the second pipeline 16; the gas in the first pipeline 15 is formed by converging carrier gas in the carrier gas pipeline 1 and reactive gas in the reactive gas pipeline 2; and the gas in the second pipeline 16 is formed by converging carrier gas in the carrier gas pipeline 6 and grafting gas in the grafting gas pipeline 14. The other end of the grafting gas pipeline 14 is connected with a grafting tank 8, and heating equipment 10 is mounted outside the grafting tank 8 and connected with a temperature-control heating module 12. The temperature-control heating module 12 includes a heating power supply and a temperature control apparatus. A liquid level measuring rod 9 is mounted at a feed inlet 13 of the grafting tank 8. The grafting gas in the grafting gas pipeline 14 is obtained by gasifying grafting monomers in the grafting tank 8. A solenoid valve 4 and a flowmeter 5 are mounted on each of the carrier gas pipeline 1, the reactive gas pipeline 2, the carrier gas pipeline 6 and the grafting gas pipeline 14. The single-electrode plasma generator consisting of the single-electrode plasma generator cathode 24 and the single-electrode plasma generator anode 25 is connected with a power matcher 26 through a power line. The single-electrode plasma generator is located in a housing with holes 29. The power supply, the power matcher 26, a cloth guide roller 28 and a cloth guide roller 21 with an adjustable-speed motor are respectively located outside the housing with holes 29, and the cloth guide roller 28 and the cloth guide roller 21 with the adjustable-speed motor are respectively arranged on the two sides of the housing with holes 29 and are parallel to each other. Holes allowing a fabric and the power line to enter and exit are formed in the housing with holes 29, and an exhaust outlet 23 and a fan 22 connected with the exhaust outlet 23 are arranged on the housing with holes 29 for collection of remaining unreacted gas. The fabric is parallel to the single-electrode plasma generator, and when the fabric 27 is placed on the cloth guide roller and passes under the single-electrode plasma generator, atmospheric plasma continuously treat the fabric.

The single-electrode plasma generator cathode 24 is formed from two cuboid aluminum alloy cuboids, and the single-electrode plasma generator cathode 25 is an aluminum alloy pipe sleeved with a glass pipe. The single-electrode plasma generator cathode 24 and the single-electrode plasma generator anode 25 are fixed through metal screws and tetrafluoroethylene insulating blocks and an aluminum alloy jacket at the two ends of electrodes to form the single-electrode plasma generator. A copper pipe is placed in the single-electrode plasma generator cathode 24, a small hole is formed in the copper pipe as a gas outlet 18 of gas, and the gas outlet 18 is located above the single-electrode plasma generator anode 25. The single-electrode plasma generator includes condensation equipment, the condensation equipment includes a condensate water inlet pipe 19, a condensation pipe and a condensate water outlet pipe 20 sequentially connected end to end; the condensate water inlet pipe 19 and the condensate water outlet pipe 20 are respectively located at the two ends of the single-electrode plasma generator; and the condensation pipe penetrates through the single-electrode plasma generator to prevent overheating of the electrode.

Preferably, a thermal insulation layer is mounted on each of the grafting gas pipeline 14, the solenoid valve 4 and the flowmeter 5 on the grafting gas pipeline 14, the second pipeline 16 and the third pipeline 17 to prevent gas condensation of the grafting monomers.

Preferably, the heating equipment 10 is configured to heat the grafting monomers for gasification, and the gasified grafting monomers enter the grafting gas pipeline 14 to be converged with the carrier gas in the carrier gas pipeline 6 in the second pipeline 16, enter the third pipeline 17, and enter the single-electrode plasma generator consisting of the single-electrode plasma generator cathode 24 and the single-electrode plasma generator anode 25 through the gas outlet 18 in the single-electrode plasma generator cathode 24, and then, change into plasma under the power for the finishing of fabric 27.

Preferably, the housing with holes 29 is made of organic glass.

Before turning on a valve and a switch of each pipeline, grafting solution 11 is added into the grafting tank 8, and the heating power supply and the temperature control apparatus of the temperature-control heating module 12 are started to provide heat and control the heating temperature to make the grafting solution to be heated and gasified.

The valve and the switch of each pipeline is turned on; the gasified grafting monomers enter the grafting gas pipeline 14 to be converged with the carrier gas in the carrier gas pipeline 6 in the second pipeline 16, enter the third pipeline 17, and enter the single-electrode plasma generator consisting of the single-electrode plasma generator cathode 24 and the single-electrode plasma generator anode 25 through the gas outlet 18 in the single-electrode plasma generator cathode, and then, change into plasma under the power to perform functional finishing on the fabric 27; and when the fabric 27 is placed on the cloth guide roller and passes under the single-electrode plasma generator, the atmospheric plasma continuously treat the fabric.

To sum up, according to the present embodiment, the grafting/reactive gas is carried by the carrier gas to enter a plasma reactor anode ensuring stable discharging and the grafting/reactive monomers changing into plasma, so that the plasma grafting and plasma polymerization can also be realized. And in the fabric finishing process, the fabric does not need to be activated by plasma first, and plasma polymerization can be directly occurred on the surface of the fabric to perform functional finishing. Meanwhile, the finishing process is applicable to many textile materials, and there is also no need for activated reactive radicals on the fabric. The equipment makes continuous treatment of textiles by atmospheric plasma and fabric finished without water come true, and there is no waste water produced, which leads to the clean production of the finishing of fabrics.

Embodiment 2: Antibacterial Finishing

A method for antibacterial finishing:

(1) A main power switch of plasma equipment is turned on firstly to power on the equipment.

(2) Grafting monomers, 1,2-diaminopropane, are added into a grafting tank 8 to be heated by a heating equipment 10 so as to be gasified; the flow rate of gasified grafting monomers is to 0.01 L/min adjusted through a solenoid valve 4 and a flowmeter 5; and then the gasified grafting monomers pass through a grafting gas pipeline 14 and are converged with carrier gas (argon, the flowrate is 8 L/min) in a carrier gas pipeline 6 in a second pipeline 16, entering a third pipeline 17, entering a single-electrode plasma generator consisting of a single-electrode plasma generator cathode 24 and a single-electrode plasma generator anode 25 through a gas outlet 18 in the single-electrode plasma generator cathode 24, and turn into plasma with the power of 300 W.

(3) a speed of cloth guide rollers is 0.05 m/s adjusted by an adjustable-speed motor on a cloth guide roller (21), and thus a cotton fabric passes under the single-electrode plasma generator to implement functional finishing on the fabric by atmospheric plasma.

Plasmaized monomers are rearranged and polymerized on the surface of the fabric 27; nitrogen-containing groups are introduced on the surface of the fabric; and the fabric is antibacterial after chlorination by a sodium hypochlorite solution of 1.0 wt %.

Figure 4:
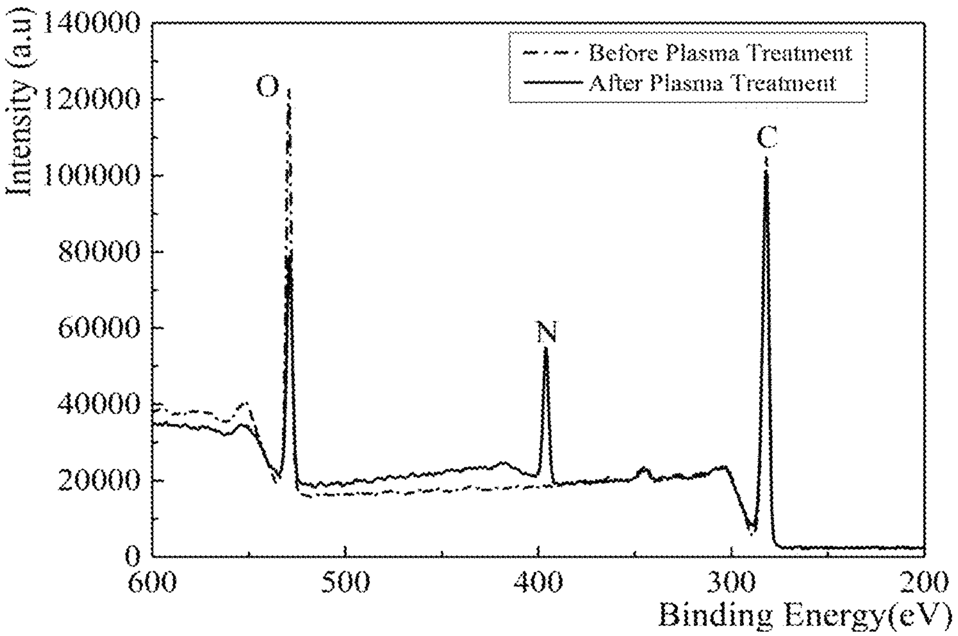
FIG. 4 is an XPS spectra of elements on the cotton fabric surface before and after plasma treatment.

The XPS spectra of the fabric before and after plasma treatment by plasma of nitrogen-containing micromolecular organic monomer is shown in FIG. 4. It can be seen from FIG. 4 that compared with the cotton fabric before plasma treatment, the XPS spectra of the cotton fabric after plasma treatment have a strong peak at 394.0 eV belonging to the electronic binding energy of N. In other words, plasma of nitrogen-containing micromolecular organic monomer can introduce nitrogen containing groups onto cotton fabrics. According to the calculation and analysis of the XPS spectra, the content of elements on the surface of the fabric is shown in Table 1. It can be known from Table 1 that the surface of the fabric consists of C and O with contents being 72.46% and 27.54% respectively before treated by plasma deposition, while the surface of the cotton fabric consists of C, O and N with contents being 68.70%, 17.28% and 14.02% respectively after treated by plasma deposition. Therefore, plasma of the nitrogen-containing micromolecular organic monomer are deposited on the surface of the cotton fabric resulting in lowering the contents of C and O.

TABLE 1

Peak area and mass concentration of element on the surface of cotton fabric

| | | C | O | N |
|---|---|---|---|---|
| Plasma untreated fabric | Peak area (a.u.) | 16085.81 | 12880.42 | — |
| | Mass concentration (%) | 72.46 | 27.54 | — |
| Plasma treated fabric | Peak area (a.u.) | 15586.03 | 8254.84 | 4680.10 |
| | Mass concentration (%) | 68.70 | 17.28 | 14.02 |

Figure 5:
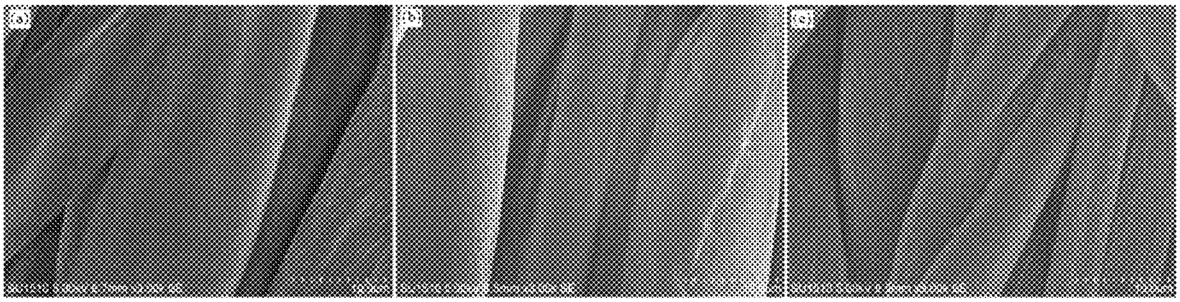
FIG. 5 is SEM images of a cotton fabric (a) before plasma treatment, (b) after plasma treatment and (c) after plasma treatment and chlorination.
Figure 6:
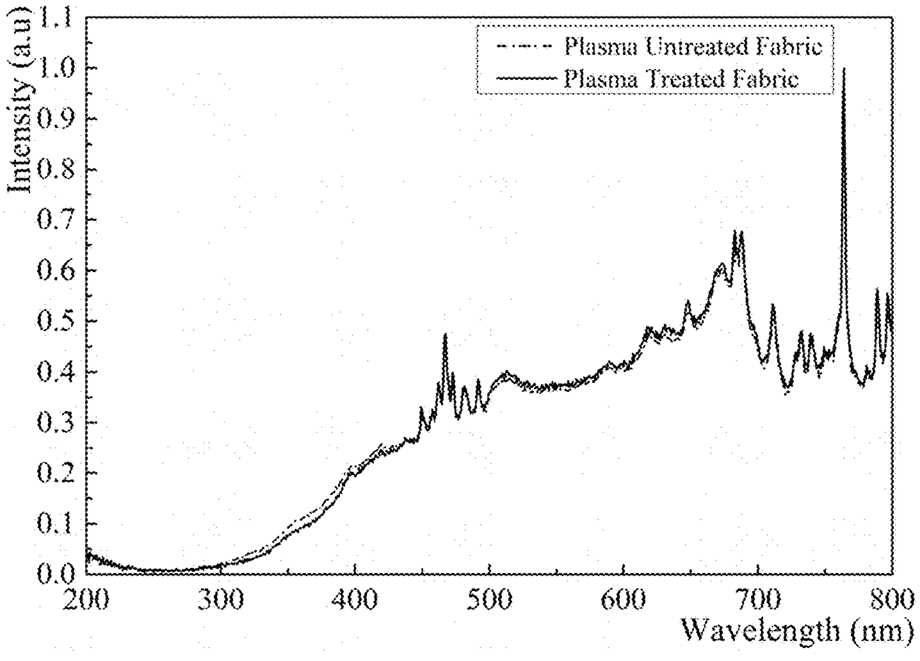
FIG. 6 is the damage degree on the fabric surface after plasma deposition treatment by grating testing system.

SEM images of the fabric before plasma treatment (a) after plasma treatment (b) and after plasma treatment and chlorination shown in FIG. 5. It is found that surface of cotton fibers before plasma treatment is smooth in FIG. 5(*a*), surface of cotton fibers after plasma treatment have lots of small cracks and net structures in FIG. 5(*b*), and these cracks as well as the net structures still present on the surface of cotton fibers after chlorination with sodium hypochlorite shown in FIG. 5(*c*). It can be seen from the SEM images that plasma of the nitrogen-containing micromolecular organic monomers has little damage to the cotton fibers. A damage degree of the fabric after plasma treatment is tested through a grating testing system, as shown in FIG. 6. Grating testing method in FIG. 6 further confirms that the damage degree on the fibers after plasma treatment is 300-450 nm compared with the untreated cotton fabric. Therefore, the damage caused by plasma treatment of the nitrogen-containing micromolecular organic monomer to the fabric is not obvious.

Figure 7:
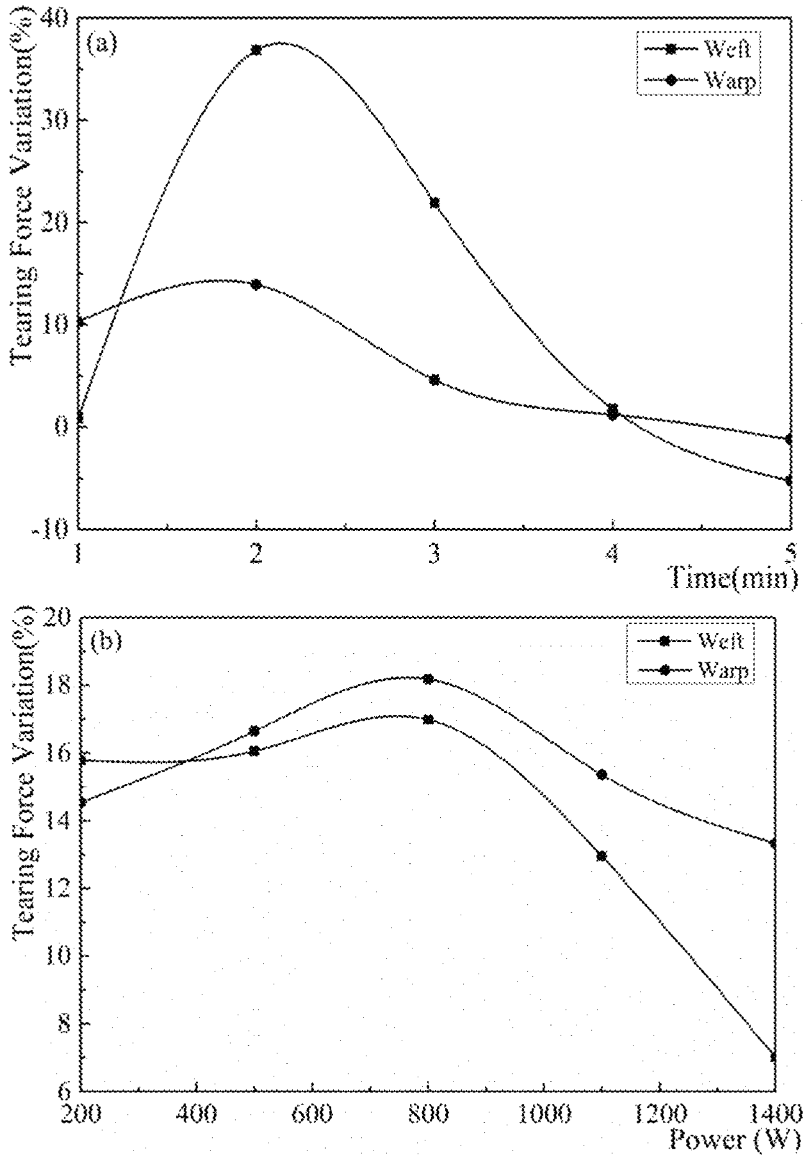
FIG. 7 is influences of (a) duration and (b) power of plasma treatment on tearing strength of fabric.

FIG. 7 is the influences of duration and power of plasma treatment on the tearing strength of the fabric. It can be seen from the figure that compared with the fabric without plasma treatment, the tearing strength of the fabric with plasma treatment is improved when the duration is within 4 min and the power is 1400 w or below, which indicates that the tearing strength of the fabric can be enhanced through plasma deposition, and thereby compensating for the strength loss of the fabric caused by plasma etching.

In addition, antibacterial property of the fabric against *Staphylococcus aureus* is tested according to AATCC 147-2016, and no microorganisms breed below or around the fabric. Meanwhile, the antibacterial property of the fabric is quantificationally tested according to AATCC 100-2012, and according to result is shown in Table 2. It can be seen that the nitrogen-containing micromolecular organic monomers are grafted on the surface of the cotton fabric through the plasma grafting method which makes the fabric antibacterial after chlorination with sodium hypochlorite solution.

TABLE 2

Antibacterial properties of plasma untreated and treated fabric

| Samples | Antimicrobial property of *staphylococcus aureus* (%) |
|---|---|
| Plasma untreated sample | 24.07 |
| Plasma treated sample | 99.63 |
| Plasma treated sample preserved for 3 months | 95.88 |

Embodiment 3: Water Repellent Finishing (1) A main power switch of a plasma equipment is turned on firstly to power on the equipment.

(2) Carbon tetrafluoride is introduced into a reactive gas pipeline 2, and its flow rate of the carbon tetrafluoride is 0.3 L/min adjusted by a solenoid valve 4 and a flowmeter 5. And then the carbon tetrafluoride is converged with the carrier gas (helium, the flow rate is 6 L/min) in a carrier gas pipeline 1 in a first pipeline 15, entering a third pipeline 17, and entering a single-electrode plasma generator consisting of a single-electrode plasma generator cathode 24 and a single-electrode plasma generator anode 25 through a gas outlet 18 in the single-electrode plasma generator cathode 24, and turn into plasma with the power of 300 W.

(3) a speed of cloth guide rollers is 0.05 m/s adjusted by an adjustable-speed motor on a cloth guide roller (21), and thus a cotton fabric passes under the single-electrode plasma generator to implement functional finishing on the fabric by atmospheric plasma.

Plasmaized monomers are rearranged and polymerized on the surface of the fabric 27, and fluorine is introduced on the surface of the fabric. Contact angle of fabric is measured: the contact angle between fabric and water is measured by an OCA40 Micro dynamic contact angle analysis system, a 5 μL drop of deionized water is placed in the sample, the result of contact angle is obtained up to 60 seconds after placement of the water drop. Each sample is measured 4 times at different positions, and the contact angle of sample expresses with the mean of four points. The contact angle of cotton fabric is respectively detected before washing and after washing 15 times. A contact angle of the fabric before washing can reach 148.7°, a contact angle of fabric after washing 15 times is 136.5°, thus, a good water repellent effect is realized.

Embodiment 4: Flame Retardant Finishing (1) A main power switch of plasma equipment is turned on firstly to power on the equipment.

(2) Mixed gas of carbon tetrafluoride and methane is introduced into a reactive gas pipeline 2, wherein the content of the carbon tetrafluoride accounts for 50% of a total gas volume; the flow rate of the mixed gas is 0.3 L/min adjusted by a solenoid valve 4 and a flowmeter 5. And then the mixed gas is converged with carrier gas (argon, the flow rate is 5 L/min) in a carrier gas pipeline 1 in a first pipeline 15, entering a third pipeline 17, and entering a single-electrode plasma generator consisting of a single-electrode plasma generator cathode 24 and a single-electrode plasma generator anode 25 through a gas outlet 18 in the single-electrode plasma generator cathode 24, and turn into plasma with the power of 400 W.

(3) A speed of cloth guide rollers is 0.1 m/s adjusted by an adjustable-speed motor on a cloth guide roller (21), and thus a fabric passes under the single-electrode plasma generator to implement functional finishing on the fabric by atmospheric plasma.

Plasmaized monomers are rearranged and polymerized on the surface of the fabric 27. The flame retardant property of the finished fabric is tested according to a vertical burning test method (GB/T20286-2006). The limit oxygen index (LOI) of the finished fabric is 26.3%, the after flame time is 2 s, and a damaged char length is 15.6 mm after igniting for 12 s; and as for the LOI of an untreated fabric is 19.1%, the after flame time is 9 s, and the damaged char length is 30.5 mm.

What is claimed is:

1. Atmospheric-pressure plasma equipment, comprising a carrier gas pipeline, a reactive gas pipeline, a grafting gas pipeline, a first pipeline, a second pipeline, a third pipeline, a single-electrode plasma generator cathode and a single-electrode plasma generator anode; wherein the third pipeline is connected with a single-electrode plasma generator consisting of the single-electrode plasma generator cathode and the single-electrode plasma generator anode; gas in the third pipeline is gas in the first pipeline or gas in the second pipeline; the gas in the first pipeline is formed by converging carrier gas in the carrier gas pipeline and reactive gas in the reactive gas pipeline; and the gas in the second pipeline is formed by converging the carrier gas in the carrier gas pipeline and grafting gas in the grafting gas pipeline; the other end of the grafting gas pipeline is connected with a grafting tank; heating equipment is mounted outside the grafting tank, and the grafting gas in the grafting gas pipeline is obtained by gasifying grafting monomers in the grafting tank; a solenoid valve and a flowmeter are mounted on each of the carrier gas pipeline, the reactive gas pipeline, the carrier gas pipeline and the grafting gas pipeline;

the single-electrode plasma generator is connected with a power matcher through a power line; the single-electrode plasma generator is located in a housing with holes; the power matcher, a cloth guide roller and a cloth guide roller with an adjustable-speed motor are separately located outside the housing with holes; the cloth guide roller and the cloth guide roller with the adjustable-speed motor are arranged on two sides of the housing with holes, respectively, and are parallel to each other; and holes allowing a fabric and the power line to enter and exit are formed in the housing with holes; and a copper pipe is placed in the single-electrode plasma generator cathode; a small hole is formed in the copper pipe as a gas outlet of gas; the gas outlet is located above the single-electrode plasma generator anode; and the gas in the third pipeline enters the single-electrode plasma generator through the gas outlet in the single-electrode plasma generator cathode.

2. The atmospheric-pressure plasma equipment according to claim 1, wherein the single-electrode plasma generator comprises condensation equipment; the condensation equipment comprises a condensate water inlet pipe, a condensation pipe and a condensate water outlet pipe sequentially connected end to end; the condensate water inlet pipe and the condensate water outlet pipe are located at two ends of the single-electrode plasma generator, respectively; and the condensation pipe penetrates through the single-electrode plasma generator to prevent overheating of its electrode.

3. The atmospheric-pressure plasma equipment according to claim 1, wherein a thermal insulation layer is mounted on each of the grafting gas pipeline, the solenoid valve and the flowmeter on the grafting gas pipeline, the second pipeline and the third pipeline to prevent gas condensation of the grafting monomers.

4. The atmospheric-pressure plasma equipment according to claim 1, wherein a feed inlet is formed in the grafting tank to add the grafting monomers into the grafting tank.

5. The atmospheric-pressure plasma equipment according to claim 1, wherein the power matcher is connected with a power supply through the power line, and the power supply is located outside the housing with holes.

6. The atmospheric-pressure plasma equipment according to claim 1, wherein the heating equipment is configured to heat the grafting monomers for gasification, and the gasified grafting monomers enter the single-electrode plasma generator through the grafting gas pipeline, the second pipeline and the third pipeline; and the heating equipment is connected with a temperature-control heating module comprising a heating power supply and a temperature control apparatus to provide heat and control a heating temperature.

7. The atmospheric-pressure plasma equipment according to claim 1, wherein a feed inlet is formed in the grafting tank to add the grafting monomers into the grafting tank; and a liquid level measuring rod is mounted at the feed inlet of the grafting tank and configured to measure a liquid level of grafting solution.

8. The atmospheric-pressure plasma equipment according to claim 1, wherein the fabric is parallel to the single-electrode plasma generator, and when the fabric is placed on the cloth guide roller and passes under the single-electrode plasma generator, atmospheric plasmas continuously treat the fabric.

9. The atmospheric-pressure plasma equipment according to claim 1, wherein an exhaust outlet and a fan connected with the exhaust outlet are arranged on the housing with holes for collection of remaining unreacted gas.

10. A method of using the atmospheric-pressure plasma equipment according to claim 1, comprising: carrying out grafting for functional finishing of a fabric through atmospheric-pressure plasma.

11. The method according to claim 10, wherein before the carrying out grafting for functional finishing of a fabric through atmospheric-pressure plasma, the method further comprises the following steps:

(1) firstly, turning on a main power switch of the atmospheric-pressure plasma equipment to power on the equipment;

(2) opening a gas cylinder of carrier gas, switching on the solenoid valves and the flowmeters to test the pipelines working normally or not;

(3) when monomers used for plasma grafting for functional finishing of the fabric are gas, carrier gas in the carrier gas pipeline being converged with monomers in the reactive gas pipeline in the first pipeline, entering the third pipeline, and then, entering the single-electrode plasma generator through the gas outlet in the single-electrode plasma generator cathode, and turning into plasma under power; and when the monomers for the plasma grafting for functional finishing of the fabric are liquid, adding the grafting monomers into a grafting tank to be heated by heating equipment for gasification, and the gasified grafting monomers passing through a grafting gas pipeline and being converged with carrier gas in the carrier gas pipeline in the second pipeline, entering the third pipeline, and entering the single-electrode plasma generator through the gas outlet in the single-electrode plasma generator cathode, and turning into plasma under the power; and (4) starting an adjustable-speed motor on the cloth guide roller and adjusting a speed of the cloth guide roller to make the fabric pass under the single-electrode plasma generator to implement functional finishing on the fabric by atmospheric plasma.

12. The method according to claim 11, wherein the reactive gas is one or more of air, oxygen, nitrogen, hydrogen, ammonia, carbon dioxide, carbon monoxide, carbon tetrafluoride and carbon tetrachloride; the carrier gas is helium or argon; and the grafting monomers are vinyl compounds, epoxy compounds, saturated hydrocarbon compounds, aromatic compounds or metallorganic compounds.

13. The method according to claim 12, wherein the functional finishing comprises antibacterial finishing, water and oil repellent finishing, flame retardant finishing, or antistatic finishing.

14. The method according to claim 13, wherein when the functional finishing is antibacterial finishing, the carrier gas is helium or argon; the reactive gas is ammonia and/or nitrogen; or the grafting monomers are nitrogen-containing micromolecular organic monomers, and the nitrogen-containing micromolecular organic monomers are methylamine, ethylenediamine, 1,2-diaminopropane, mono-propargylamine, isopropyl amine, diisopropylamine, n-propylamine or di-n-propylamine.

15. The method according to claim 13, wherein when the functional finishing is water and oil repellent finishing of fabric, the carrier gas is helium or argon; the reactive gas is the carbon tetrafluoride; or the grafting monomers are difluoro ethylene, tetrafluoroethylene or hexafluoro ethylene.

16. The method according to claim 13, wherein when the functional finishing is the flame retardant finishing, the carrier gas is helium or argon; and the reactive gas is carbon tetrafluoride, or the grafting monomers are acrylic acid.

17. The method according to claim 13, wherein when the functional finishing is the antistatic finishing, the carrier gas is helium or argon; and the reactive gas is sulfur dioxide, or the grafting monomers are acrylic acid or vinyl monomers.

18. The method according to claim 10, wherein operation parameters of production of plasma are as follows: a flow rate of the carrier gas is 1-15 L/min, a gasification temperature of the monomers is 0-200° C., a thermal insulation temperature for gasified monomers is 0-200° C., a flow rate of the gasified monomers is 0.006-0.06 L/min, and power of a power supply is 0-500 W.

19. The method according to claim 10, wherein a conveying speed of the fabric is controlled through a motor on the cloth guide roller, and a speed range is 0.001-0.1 m/s.

* * * * *